US012612506B2

(12) United States Patent
Boyle et al.

(10) Patent No.: US 12,612,506 B2
(45) Date of Patent: Apr. 28, 2026

(54) CONDUCTIVE POLYMER COMPOSITE

(71) Applicant: SENERGY INNOVATIONS LIMITED, Antrim (GB)

(72) Inventors: Christine Boyle, Belfast (GB); Findhan Strain, Belfast (GB); Niall McGonigle, Belfast (GB); Tony McNally, Belfast (GB); Sandeep Kumar, Belfast (GB)

(73) Assignee: SENERGY INNOVATIONS LIMITED, Belfast (GB)

( * ) Notice: Subject to any disclaimer, the term of this patent is extended or adjusted under 35 U.S.C. 154(b) by 0 days.

(21) Appl. No.: 18/710,443

(22) PCT Filed: Nov. 17, 2022

(86) PCT No.: PCT/GB2022/052926
§ 371 (c)(1),
(2) Date: May 15, 2024

(87) PCT Pub. No.: WO2023/089326
PCT Pub. Date: May 25, 2023

(65) Prior Publication Data
US 2025/0282926 A1 Sep. 11, 2025

(30) Foreign Application Priority Data
Nov. 18, 2021 (GB) ...................................... 2116666

(51) Int. Cl.
*H01B 1/24* (2006.01)
*C08K 3/04* (2006.01)
(Continued)

(52) U.S. Cl.
CPC ................ *C08K 3/042* (2017.05); *C08K 3/28* (2013.01); *C08K 3/38* (2013.01); *C08K 7/06* (2013.01);
(Continued)

(58) Field of Classification Search
CPC . H01B 1/022; H01B 1/24; H01B 3/18; H01B 3/47; C08K 3/042; C08K 3/28; C08K 3/38
See application file for complete search history.

(56) References Cited

U.S. PATENT DOCUMENTS 11,180,625 B2 * 11/2021 Prebe .................... B29C 67/202
12,024,668 B2 * 7/2024 Zekriardehani ......... C08L 81/04
(Continued)

FOREIGN PATENT DOCUMENTS

CN 105238044 A 1/2016
CN 106382150 A 2/2017
(Continued)

OTHER PUBLICATIONS

Ryu et al "Facile Liquid-Exfoliation Process of Boron Nitride Nanosheets for Thermal Conductive Polyphthalamide Composite", Polymers 2019, 11, 1628; doi: 10.3390/polym11101628.*
(Continued)

*Primary Examiner* — Mark Kopec
(74) *Attorney, Agent, or Firm* — ALLEN, DYER, DOPPELT + GILCHRIST, P.A.

(57) ABSTRACT

The present invention relates to a composite comprising a polymer matrix, graphene and at least one thermally conductive inorganic filler, wherein the graphene and the at least one thermally conductive inorganic filler are dispersed within the polymer matrix. The composites have high thermal conductivities and are particularly useful in solar thermal collectors and other heat exchangers.

11 Claims, 3 Drawing Sheets

(51) Int. Cl.

| | |
|---|---|
| ***C08K 3/28*** | (2006.01) |
| ***C08K 3/38*** | (2006.01) |
| ***C08K 7/06*** | (2006.01) |
| ***C08K 7/24*** | (2006.01) |
| *F24S 70/14* | (2018.01) |

(52) U.S. Cl.
CPC ................. *C08K 7/24* (2013.01); *H01B 1/24* (2013.01); *C08K 2003/282* (2013.01); *C08K 2003/385* (2013.01); *C08K 2201/001* (2013.01); *C08K 2201/005* (2013.01); *F24S 70/14* (2018.05)

(56) References Cited

U.S. PATENT DOCUMENTS

| | | | | |
|---|---|---|---|---|
| 2011/0040007 | A1 | 2/2011 | Chandrasekhar et al. | |
| 2020/0248014 | A1* | 8/2020 | Bougher .................. | C08K 3/04 |

FOREIGN PATENT DOCUMENTS

| | | | | |
|---|---|---|---|---|
| CN | 106751790 | A | | 5/2017 |
| CN | 109280387 | A | | 1/2019 |
| CN | 109553908 | A | * | 4/2019 |
| CN | 110669317 | A | | 1/2020 |
| CN | 111378226 | A | | 7/2020 |
| CN | 109206896 | B | | 3/2021 |
| CN | 113604036 | A | | 11/2021 |
| CN | 111873283 | | | 11/2022 |

OTHER PUBLICATIONS

He et al.“Significantly enhanced thermal conductivity in polyimide composites with the matching of graphene flakes and aluminum nitride by in situ polymerization”, Polymer Composites. 2020;41:740-747.*

Liang et al.“Synergetic enhancement of thermal conductivity by constructing BN and AlN hybrid network in epoxy matrix”, Journal of Polymer Research (2020) 27: 212; https://doi.org/10.1007/s10965-020-02193-3.*

Esfahani et al.“Rheological, thermal, and electrical characterization polyamide/polypropylene blend composites containing hybrid filler: Boron nitride and reduced graphene oxide”, SPE Polymers. 2021;2:134-144.*

English language form PCT/ISA/237 (mailed Feb. 14, 23).*

Global Technical Datasheet for LNP™ Konduit™ Compound OX11315, (No publication date).

European Technical Datasheet for LNP™ Konduit™ Compound PX10323, (No publication date).

Technical Datasheet for TECACOMP PA66 TC black 3989—Compounds. Ensinger, (No publication date).

Technical Datasheet for TECACOMP PBT TC black 4207—Compounds. Ensinger, (No publication date).

Technical Datasheet for Technoform PP-GR and PPS-GR. “Material properties, Polymer-based heat transfer solutions.” Technoform, (No publication date).

International Search Report and Written Opinion issued in counterpart PCT Application No. PCT/GB2022/052926 dated Feb. 14, 2023 (ten (10) pages).

Great Britain Search Report issued in counterpart GB Application No. 2116666.5 dated Mar. 29, 2022 (four (4) pages).

* cited by examiner

CONDUCTIVE POLYMER COMPOSITE

CROSS REFERENCE TO RELATED APPLICATIONS

This application is a 35 U.S.C. § 371 U.S. national phase entry of International Patent Application No. PCT/GB2022/052926 having an international filing date of Nov. 17, 2022, which claims the benefit of Great Britain Patent Application No. 2116666.5 filed Nov. 18, 2021, each of which are incorporated herein by reference in their entireties.

The present invention relates to a composite comprising a polymer matrix, graphene and at least one thermally conductive inorganic filler, wherein the graphene and the at least one thermally conductive inorganic filler are dispersed within the polymer matrix. The composites have high thermal conductivities and are particularly useful in solar thermal collectors and other heat exchangers.

BACKGROUND

Polymer composites comprising thermally conductive filler materials offer new possibilities for replacing metal parts in applications such as thermal collectors. Polymer composites are light weight and therefore easier to install and handle than their metal counterparts. The filler material dispersed within the polymer matrix may be carefully selected to ensure efficient and effective infra-red absorption and/or thermal conduction.

Polyphthalamides (PPA) are a class of polyamide polymer that have improved chemical resistance and UV-stability compared to other polymers, including other polyamides.

Graphitic forms of carbon, such as graphite and graphene, possess high thermal conductivities.

SUMMARY OF THE INVENTION

In a first aspect of the invention, there is provided a composite comprising a polymer matrix, graphene and at least one thermally conductive inorganic filler, wherein the graphene and the at least one thermally conductive inorganic filler are dispersed within the polymer matrix.

Graphene

A single molecular layer of graphene is one atom thick and can therefore be described as a single atomic layer ("layer"). Typically, the graphene will have an average thickness of <10 layers.

The average particle size of the graphene may be >1 μm, e.g. >10 μm. The average particle size (e.g. the $D_V50$) of the graphene may be <200 μm, e.g. <75 μm. It may be that the average particle size (e.g. the $D_V50$) of the graphene is between 10 μm and 60 μm. The average particle size of the graphene (e.g. the $D_V50$) may between 40 μm and 60 μm, e.g. between 45 μm and 55 μm.

It may be that greater than 50% by weight (e.g., greater than 75%, greater than 90% or greater than 98% by weight) of the graphene has a particle size of >1 μm, e.g. >10 μm. It may be that greater than 50% by weight (e.g., greater than 75%, greater than 90% or greater than 98% by weight) of the graphene has a particle size of <200 μm, e.g. <75 μm. It may be that greater than 50% by weight (e.g., greater than 75%, greater than 90% or greater than 98% by weight) of the graphene has a particle size of between 10 μm and 60 μm.

It may be that the oxygen content in the graphene is >2 wt %, e.g., >5 wt %. It may be that the oxygen content in the graphene is <50 wt % e.g., <35 wt %.

The graphene may be pristine graphene, e.g. that which has been directly exfoliated from graphite. The graphene may be reduced graphene oxide. It may be that the graphene is functionalised graphene. It may be that the graphene is graphene nanoplatelets.

It may be that the wt % of the graphene in the polymer matrix is >25 wt %, e.g. >30 wt %. It may be that the wt % of the graphene in the polymer matrix is <80 wt %. It may be that the wt % of the graphene in the polymer matrix is <60 wt %. It may be that the wt % of the graphene in the polymer matrix is in the range from 25 wt % to 70 wt %, e.g., from 30 wt % to 65 wt %. It may be that the wt % of the graphene in the polymer matrix is in the range from 35 wt % to 65 wt %. It may be that the wt % of the graphene in the polymer matrix is in the range from 40 wt % to 60 wt %.

Thermally Conductive Inorganic Filler

It may be that the at least one thermally conductive inorganic filler comprises a group 13 nitride. It may be that the group 13 nitride is boron nitride or aluminium nitride. It may be that the group 13 nitride is boron nitride. Preferably, the group 13 nitride is aluminium nitride. It may be that the at least one thermally conductive inorganic filler comprises more than one group 13 nitride. It may be that the at least one thermally conductive inorganic filler comprises a combination of group 13 nitrides selected from boron nitride, aluminium nitride, gallium nitride and indium nitride. It may be that the at least one thermally conductive inorganic filler comprises aluminium nitride and an additional group 13 nitride selected from boron nitride, gallium nitride and indium nitride. It may be that the at least one thermally conductive inorganic filler comprises boron nitride and aluminium nitride The inventors have found that the dispersion of both graphene and a group 13 nitride, e.g. aluminium nitride, within a polymer matrix provides a composite with favourable thermal conductivity. Without wishing to be bound by theory, it is thought that the group 13 nitride particles associate with the graphene flakes, forming a scaffold in which the particles of group 13 nitride are situated between flakes of graphene.

It may be that the at least one thermally conductive inorganic filler comprises a metal oxide or a carbide, e.g. SiC. It may be that the at least one thermally conductive inorganic filler comprises an aluminium oxide, e.g. AlO, $Al_2O$ or $Al_2O_3$, or magnesium oxide. It may be that the at least one thermally conductive inorganic filler does not contain carbon.

It may be that the wt % of the at least one thermally conductive inorganic filler in the polymer matrix is in the range from 0.1 wt % to 50 wt %. The wt % of the at least one thermally conductive inorganic filler in the matrix may be in the range from 5 wt % to 40 wt %. The wt % of the at least one thermally conductive inorganic filler in the matrix may be in the range from 10 wt % to 30 wt %, e.g., from 15 wt % to 25 wt %.

In embodiments where the at least one thermally conductive inorganic filler comprises aluminium nitride, the average particle size of the AlN may be <10 μm, e.g. <5 μm. The average particle size of the AlN may be from 0.1 μm to 5 μm, e.g. 0.1 μm to 3 μm. It may be that greater than 50% by weight (e.g., greater than 75%, greater than 90% or greater than 98% by weight) of the AlN has a particle size of <10 μm, e.g. <5 μm. It may be that greater than 50% by weight (e.g., greater than 75%, greater than 90% or greater than 98% by weight) of the AlN has a particle size of from >0.1 μm to 5 μm, e.g. >0.1 μm to 3 μm.

The ratio of graphene particle size: AlN particle size may in the range from 1:1 to 100:1. The ratio of graphene particle size: AlN particle size may in the range from 5:1 to 60:1. The ratio of graphene particle size: AlN particle size may be in the range from 10:1 to 30:1.

In embodiments where the at least one thermally conductive inorganic filler comprises boron nitride (BN), the BN may be hexagonal boron nitride (h-BN). It may be that the BN is boron nitride nanosheet. The BN may have an average particle size of <2 μm, e.g. <1 μm.

Total Loading

It may be that the total wt % of the graphene and the at least one thermally conductive inorganic filler (i.e. the total wt % of filler) in the polymer matrix is >40 wt %. It may be that the total wt % of filler in the polymer matrix is >50 wt %, e.g. >60 wt %. It may be that the total wt % of filler in the polymer matrix is <90 wt %, e.g. <80 wt %. It may be that the total wt % of filler in the polymer matrix is in the range from 40 wt % to 90 wt %, e.g., from 50 wt % to 80 wt %. It may be that the total wt % of filler in the polymer matrix is in the range from 60 wt % to 80 wt %.

It may be that the weight ratio of graphene: at least one thermally conductive inorganic filler in the polymer matrix is from 1:1-10:1. It may be that the weight ratio of graphene: at least one thermally conductive inorganic filler in the polymer matrix is from 3:2 to 7:1. It may be that the weight ratio of graphene: at least one thermally conductive inorganic filler in the polymer matrix is from 2:1 to 4:1, e.g. from 2:1 to 3:1.

It may be that the wt % of the graphene in the polymer matrix is greater than the wt % of the at least one thermally conductive inorganic filler in the matrix.

Polymer

The polymer matrix material may include any one of the following polymer matrices: acrylonitrile butadienestyrene (ABS) (chemical formula $(C_8H_8 \cdot C_4H_6 \cdot C_3H_{3N})_n$); polycarbonate/acrylonitrile butadiene styrene alloys (PCABS); polybutylene terephthalate (PBT); polyphenylene oxide; polyphthalamide (PPA); polyphenylene sulfide (PPS); polyphenylene ether; modified polyphenylene ether containing polystyrene; liquid crystal polymers; polystyrene; styrene-acrylonitrile copolymer; rubber-reinforced polystyrene; poly ether ketone (PEEK); acrylic resins such as polymers and copolymers of alkyl esters of acrylic and methacrylic acid styrene-methyl methacrylate copolymer, styrene-methyl methacrylate-butadiene copolymer, polymethyl methacrylate and methyl methacrylate-styrene copolymer; polyvinyl acetate; polysulfone; polyether sulfone; polyether imide; polyarylate; polyamideimide; polyvinyl chloride; vinyl chloride-ethylene copolymer; vinyl chloride-vinyl acetate copolymer; polyimides, polyamides; polyolefins such as polyethylene; ultra-high molecular weight polyethylene; high density polyethylene; linear low density polyethylene; polyethylene napthalate; polyethylene terephthalate; polypropylene; chlorinated polyethylene; ethylene acrylic acid copolymers; polyamides; polyanilines; polypyrroles; polyurethanes; polyepoxides; epoxy resins; phenylene oxide resins; phenylene sulfide resins; polyoxymethylenes; polyesters; polyvinyl chloride; vinylidene chloride/vinyl chloride resins; vinyl aromatic resins such as polystyrene; poly (vinylnaphthalene); poly(vinyltoluene); polyimides; polyaryletheretherketone; polyetheretherketones; and polyaryletherketone, or a mixture of copolymer thereof.

The matrix may comprise an aromatic polymer. The inventors have surprisingly found that composites comprising an aromatic polymer, e.g. PPA, matrix provide good thermal conductivity.

The matrix may comprise polyphenylene sulfide (PPS).

The matrix may comprise a phenyl ether polymer. The phenyl ether polymer may comprise polyphenyl ether (PPE) or poly(p-phenylene oxide) (PPO). The matrix may comprise polystyrene. The matrix may comprise a blend, e.g. an amorphous blend of a phenyl ether polymer and polystyrene. The matrix may comprise a blend, e.g. an amorphous blend, of a polyphenyl ether (PPE) and polystyrene. The matrix may comprise a blend, e.g. an amorphous blend of a polyphenyl ether (PPE) and polyphenylene sulfide (PPS). The matrix may comprise a blend, e.g. an amorphous blend of a polyphenyl ether (PPE) and polyphthalamide (PPA).

The matrix may comprise a polyamide (nylon). The polymer matrix may comprise an aliphatic polyamide or an aromatic polyamide, e.g. a polyphthalamide. The polymer matrix may comprise an aromatic polyamide (i.e. an aramid). The polymer matrix may comprise an aliphatic polyamide or a polyphthalamide. The polymer matrix may comprise an aliphatic polyamide. For example, it may be that the matrix comprises nylon 6, nylon 66, or a mixture thereof. The polymer matrix may comprise nylon 11 (PA 11). The polymer matrix may comprise a polyphthalamide. Polyphthalamide (PPA) may be selected from a polymer having general formula (I), a polymer having general formula (II), a polymer composed of a combination of units of formulae (I) and (II) in the same polymer chain and a mixture thereof:

(I)

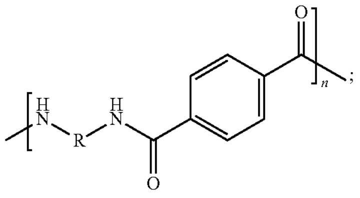

(II)

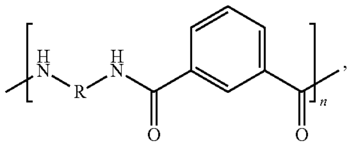

wherein n is an integer and R is an alkylene, e.g. $C_2$-$C_8$-alkylene. For the absence of doubt, when the polyphthalamide is composed of a combination of repeating units of formulae (I) and (II) in the same polymer chain, the terminal amino group of one repeating unit is bonded to the terminal carbonyl group of another repeating unit.

It may be that the polymer matrix comprises a compound of formula (I), wherein R is $C_2$-$C_6$-alkylene. It may be that the polymer matrix comprises a compound of formula (II), wherein R is $C_2$-$C_6$-alkylene. It may be that the polymer matrix comprises a polymer composed of a combination of repeating units of formulae (I) and (II) in the same polymer chain, wherein R is $C_2$-$C_6$-alkylene.

The polymer matrix may comprise a crystalline polymer. The polymer matrix may comprise a semi-crystalline polymer. The polymer matrix may comprise a thermoplastic polymer, a thermosetting polymer or an elastomer. The polymer matrix may comprise a thermoplastic polymer. The polymer matrix may comprise a homopolymer or a copolymer.

It may be that the polymer matrix in which the graphene and the at least one thermally conductive inorganic filler is dispersed consists of >75 wt %, e.g. >80%, of a single polymer. It may be that the polymer matrix consists of >90 wt %, e.g., >98 wt % of a single polymer. The single polymer may be any polymer referred to above.

It may be that the composite further comprises an additional filler dispersed within the polymer matrix. It may be that the additional filler is carbonaceous filler, e.g., carbon nanotubes or carbon fibers.

Solar Thermal Collector

In a second aspect of the invention is provided a solar thermal collector comprising a composite according to the first aspect.

It may be that the solar thermal collector comprises a hollow body having a lower wall, an upper wall and lateral side walls and an internal cavity within said hollow body for receiving a heat exchange medium, wherein at least a portion of the upper wall is formed from a composite according to the first aspect.

Optically Transmissive Panel

The solar thermal collector may further comprise an optically transmissive panel located above the upper wall of the body. The optically transmissive panel may comprise glass, polycarbonate or PMMA glazing. The upper wall of the body and the optically transmissive panel may form an air gap therebetween. The upper wall of the body and the optically transmissive panel may form a vacuum therebetween. The solar thermal collector will still be effective irregardless of whether the upper wall of the body and the optically transmissive panel form an air gap or a vacuum therebetween. The upper wall may comprise a series of integrally formed vertically extending ribs or projections that support the optically transmissive panel. At least a portion of the upper surface of the optically transmissive panel may be abraded to reduce reflectivity thereof.

Heat Exchange Medium

The heat exchange medium will typically be a liquid. The heat exchange medium may be selected from water, glycol, oils, or a combination thereof. It may be that the heat exchange medium is water. It may be that the heat exchange medium is a mixture of water and glycol.

Cavity

A plurality of flow diverter baffles or vanes may be located within the internal cavity of the solar thermal collector for directing the flow of the heat exchange medium. The plurality of flow diverter baffles or vanes may direct the flow of the heat exchange medium in a direction substantially perpendicular to two of the lateral side walls of the body. It may be that the flow diverter baffles or vanes are formed from a corrugated sheet inserted within the cavity of the body, said corrugated sheet having corrugations arranged perpendicular to the two of lateral side walls of the body. The peaks of at least some of the corrugations of the corrugated sheet may be adhered to the upper wall of the body.

End Caps

The solar thermal collector may further comprise one or more end caps for closing the open ends of the hollow body. One or both of the end caps may include at least one port for delivering a heat transfer liquid into or out of the cavity with the body of the collector. At least one of the end caps may be provided with one or more drain holes for preventing the accumulation of external liquid within the air gap formed between the upper wall of the body and the optically transmissive panel.

Thermally Insulating Material

It may be that a layer of thermally insulating material is applied to at least the lower wall of the hollow body. The layer of thermally insulating material may extend around to at least a lower portion of the lateral sides of the hollow body. The thermally insulating material may comprise polyurethane foam, mineral wool, fiberglass or another insulating material.

The invention may be as described in one of the following numbered paragraphs:

1. A composite comprising a polymer matrix, graphene and at least one thermally conductive inorganic filler, wherein the graphene and the at least one thermally conductive inorganic filler are dispersed within the polymer matrix.
2. A composite according to paragraph 1, wherein the wt % of graphene in the matrix is in the range from 30 wt % to 70 wt %.
3. A composite according to paragraph 1 or paragraph 2, wherein the average particle size of the graphene is between 10 μm to 70 μm.
4. A composite according to any preceding paragraph, wherein the wt % of the at least one thermally conductive inorganic filler in the matrix is in the range from 10 wt % to 30 wt %.
5. A composite according to any preceding paragraph, wherein the at least one thermally conductive inorganic filler comprises a group 13 nitride.
6. A composite according to paragraph 5, wherein the group 13 nitride comprises aluminium nitride (AlN).
7. A composite according to paragraph 6, wherein the average particle size of the AlN is from 0.1 μm to 5 μm.
8. A composite according to any preceding paragraph, wherein the polymer matrix comprises a polyamide.
9. A composite according to paragraph 8, wherein the polymer matrix comprises a polyphthalamide.
10. A solar thermal collector comprising the composite of any preceding paragraph.
11. A solar thermal collector according to paragraph 10 comprising a hollow body having a lower wall, an upper wall and lateral side walls and an internal cavity within said hollow body for receiving a heat exchange medium, wherein at least a portion of the upper wall is formed from the composite.

BRIEF DESCRIPTION OF THE DRAWINGS

Embodiments of the invention are further described hereinafter with reference to the accompanying drawings, in which.

Figure 1:
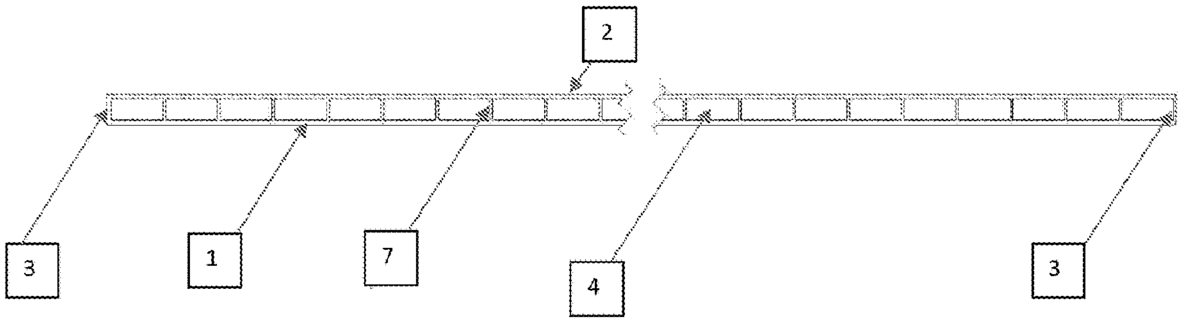
FIG. 1 is an exemplary solar thermal collector with a hollow body having a lower wall (1), an upper wall (2) and lateral side walls (3) and an internal cavity (4) within said hollow body for receiving a heat exchange medium. The solar thermal collector also has flow diverters (baffles) (7). At least a portion of the upper wall is formed from a composite of the present invention.
Figure 2:
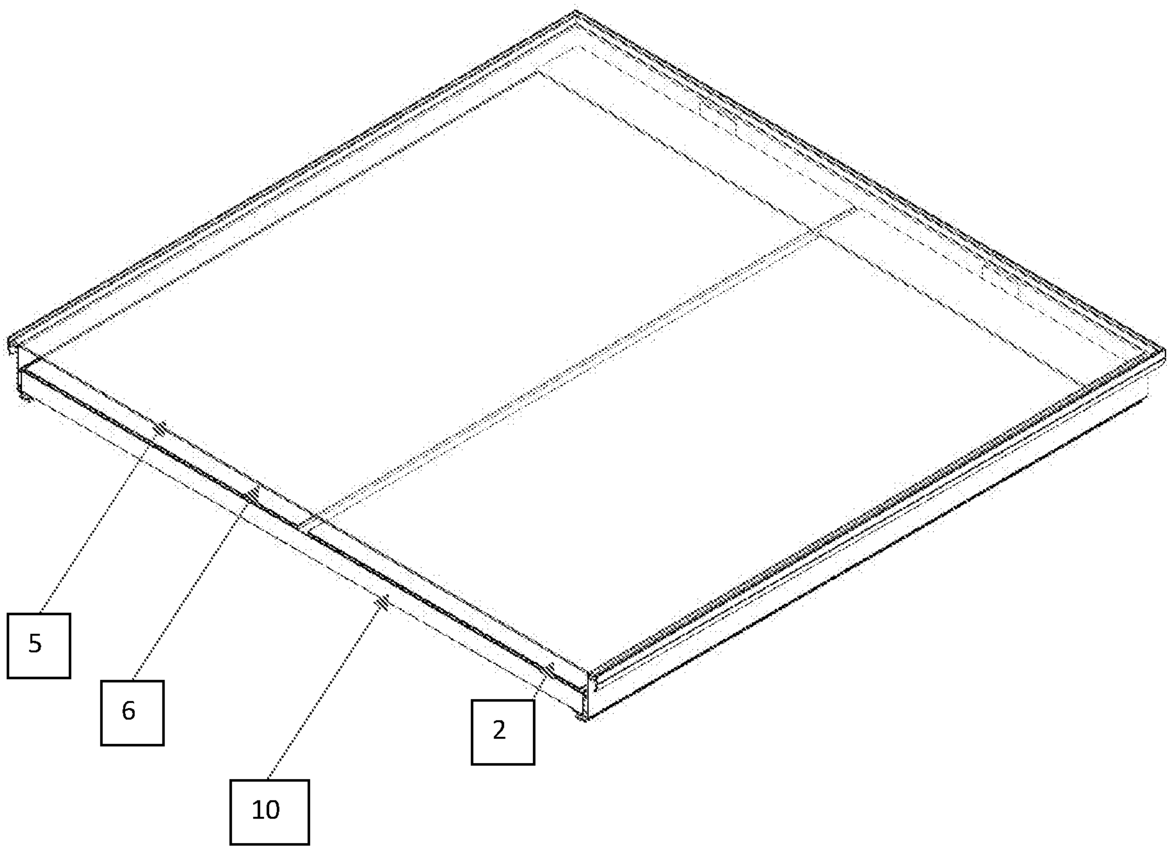
FIG. 2 is an exemplary solar thermal collector containing all the features described in FIG. 1 and further containing an optically transmissive panel (5) located above the upper wall (2) of the hollow body, the upper wall of the body and the optically transmissive panel forming an air gap (6) therebetween. The solar thermal collector also has a layer of thermally insulating material (10) applied to the lower wall of the hollow body.
Figure 3:
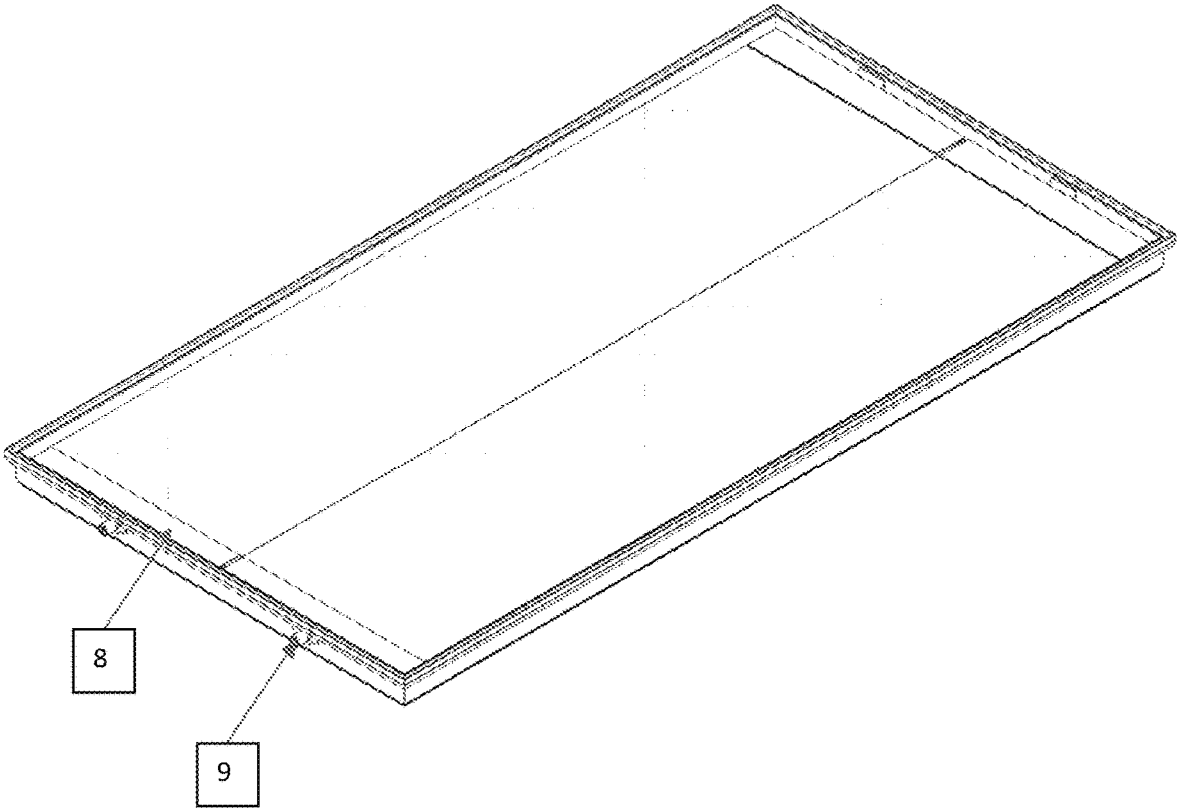
FIG. 3 is an exemplary solar thermal collector containing all the features described in FIG. 1 and further containing end caps (8) for closing the open ends of the hollow body.

The end caps include a port (9) for delivering a heat transfer liquid into or out of the cavity with the body of the collector.

DETAILED DESCRIPTION

Graphene is the name given to a flat sheet, e.g. a flat monolayer, of $sp^2$-hybridised carbon atoms tightly packed into a two-dimensional (2D) honeycomb lattice. Typically, graphene consists of 10 layers or less stacked on top of each other.

The "average particle size" may be the median particle size (or median particle diameter), i.e. the particle size of which approximately 50% of the particles are smaller in size than and approximately 50% of the particles are larger in size than, commonly referred to as the $D_{50}$. For example, graphene having a $D_{50}$ of 50 μm means that approximately 50% of the graphene particles are smaller in size than 50 μm (and approximately 50% of the graphene particles are larger in size than 50 μm). The term "average particle size" used herein may therefore be the $D_{50}$.

$D_{50}$ may be measured by methods well known in the art. A common method is particle size screening by laser diffraction (this technique is an international standard recognised by the ISO; ISO 13320:2020). Laser diffraction provides a particle size of which approximately 50% by volume of the particles are smaller in size than (since this technique assumes a spherical particle shape in its optical mode). This may be referred to as the $D_v50$.

The term "aromatic polymer" is intended to cover any polymer comprising a repeating unit that comprises an aromatic ring system (i.e. a ring system containing 2 (2n+1) TT electrons). Typically, aromatic polymers comprise a repeating unit that comprises a phenyl ring. Examples of aromatic polymers include polyphthalamide (PPA), polyphenylene sulfide (PPS), polyphenyl ether (PPE) and poly (p-phenylene oxide) (PPO).

For the absence of doubt, the term "polyamide" and "nylon" are interchangeable in this specification.

For the absence of doubt, "nylon 6" has the following structure:

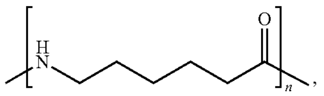

wherein n as in integer.

For the absence of doubt, "nylon 66" has the following structure:

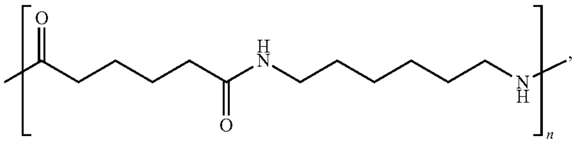

wherein n as in integer.

For the absence of doubt, "nylon 11" has the following structure:

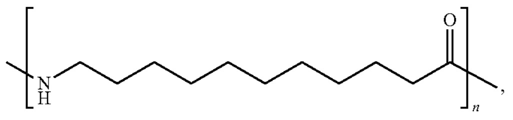

wherein n as in integer.

The term "alkylene" refers to a bivalent linear or branched saturated hydrocarbon chain. For example, "$C_2$-$C_6$-alkylene" may refer to methylene, ethylene, n-propylene, iso-propylene, n-butylene, sec-butylene, tert-butylene, n-pentylene or n-hexylene.

The term "inorganic filler" is intended to refer to any chemical compound comprising two or more elements that lacks carbon-carbon bonds or carbon-hydrogen bonds. It excludes metals, e.g. pure metals and metal alloys. It may be that the inorganic filler does not comprise carbon.

Boron nitride nanosheet is a two-dimensional crystalline form of hexagonal boron nitride, which has a thickness of one to few atomic layers.

The term "heat exchange medium" is intended to cover any subsance that can store heat in a reversible form and that can be circulated around a heating system.

The term "upper wall" used to define the solar thermal collector of the second aspect equates to the upwards facing wall of the collector when the solar collector is in normal use, i.e. the wall that would face in the direction of the sun when the the solar collector is in nromal use. The "lower wall" equates to the wall opposite the upper wall, i.e. the wall that would face in the oppsoite direction to the sun when the solar collector is in nromal use. The same logic applies to the "upper surface" of the optically transmissive panel, i.e., the surface that would face in the direction of the sun when the the solar collector is in normal use.

The upper wall may comprise a series of integrally formed vertically extending ribs or projections that support the optically transmissive panel. The term "vertically" used in this context is intended to mean substantially perpendicular to the upper surface of the upper wall, the upper surface of the upper wall being the surface of the upper wall that would face in the direction of the sun when the the solar collector is in normal use.

For the absence of doubt, unless stated otherwise, wt % is the weight % of the specified component relative to the total weight of the composite.

The composites of the present invention may be used in a heat exchanger. Heat exchangers are used to transfer heat from one medium to another. The media may be a gas, liquid, or a combination of both. Heat exchangers can improve the energy efficiency of certain systems by redistributing (transferring) heat from an area where it is not needed to an area of the system where it can be usefully used.

Heat exchangers have a number of applications, such as in battery packaging and powertrains, under the hood electronics, automotive lighting, home heat recovery in heating, ventilation, and air conditioning (HVAC), industrial heat recovery, applications using sea water or greywater, general electrical and electronics, e.g. thermal management of motherboards and chips, in healthcare and in aerospace. The heat exchanger may be a heat sink.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

EXAMPLES

The composites of the present invention can be manufactured according to the following procedure.

Preparation of Composites: Compounding.

- Prior to manufacture, the polymer, graphene, the thermally conductive inorganic filler and any additives are dried in a desiccant or oven dryer at 100° C. for upwards of 8 hours, e.g. for 24 hours.
- The polymer is then ground to a powder on a micron level via a freezer mill using liquid nitrogen for ~20 minutes.
- The polymer and fillers (graphene, thermally conductive inorganic filler and any additives) are then dried again for 24 hours.
- The polymer and fillers are dry mixed at ~2000 rpm for 5 minutes.
- Within less than a day after drying, the dry mixture is directly fed into a co-rotating twin screw extruder for compounding the material, with temperatures in the range of 300-340° C.
- The extrude is cooled by passing it through a water bath as per typical industrial methods known in the art associated with the base polymer.
- The extrude is then pelletised as per typical procedures known in the art, collected and stored.
- Prior to any further use, samples are dried again.
- Composites can then be moulded by compression moulding, extrusion moulding or injection moulding. A method of compression moulding is described below.

It is critical that during compounding moisture levels within the polymer are kept to a minimum (ideally <0.1%). This may be done, e.g. by drying in a desiccant oven and drying samples again before moulding.

Preparation of Composites: Compression Moulding.

- The compression moulding machine is pre-heated to within 300-340° C.
- The composite pellets are placed into a 50 mm diameter disc shaped compression mould, enabling a finished sample thickness of just under 2.5 mm. Pre-heating takes several minutes.
- The pattens are closed to approximately 1 Bar pressure maintained for approximately 10 minutes to facilitate polymer melting.
- Following this, 100 bar pressure is applied for approximately 25 minutes to enable full consolidation.
- Cooling of the pattens takes place at 20° C. per minute to 50° C. prior to sample removal.
- Sample conditioning then takes place based on the subsequent relevant test procedure.

It will be evident to those skilled in the art that certain parameters, e.g. the temperature of the twin screw extruder, will be determined by the specific polymer used.

Measuring Thermal Conductivity

The thermal conductivity of the composites obtained by the procedures outlined above can be measured according to the to the ASTM E1530 method; a standard test method for evaluating the resistance to thermal transmission by the guarded heat flow meter technique. This method is commonly used in the art to measure thermal conductivity.

Thermal Conductivity Data

Certain composites according to the present invention were manufactured according to the above-mentioned method. The thermal conductivity of these composites was then measured according to the above-mentioned method. The results can be seen in the table below.

| | | Weight % of filler material relative to the total weight of the composite | | | | | | Thermal |
|---|---|---|---|---|---|---|---|---|
| Composite | Polymer | GNP P20 | AIN | BNNS | CF | SGL EG | Total | conductivity (W/m · K) |
| 1 | PPA | 25 | 25 | | | | 50 | 1.41 |
| 2 | PPA | 25 | | 25 | | | 50 | 1.90 |
| 3 | PPA | 25 | 15 | 10 | | | 50 | 1.50 |
| 4 | PPA | 25 | 15 | | 10 | | 50 | 1.00 |
| 5 | PPA | 25 | | 15 | 10 | | 50 | 1.39 |
| 6 | PPA | 50 | 20 | | | | 70 | 18.80 |
| 7 | PPA | | 10 | | | 30 | 40 | 4.32 |

In all tested composites, the polyphthalamide polymer used was the base resin DuPont™ Zytel® HTN FE8200.

Details of the filler materials used in each composite can be seen in the table below.

| Abbreviation | Filler | Manufacturer | Particle size | Diameter | Length |
|---|---|---|---|---|---|
| GNP P20 | Graphene nano platelet | First Graphene | 20 µm | — | — |
| AIN | Aluminium nitride powder | Goodfellow | 1.4 µm | — | — |
| BNNS | Boron nitride nanosheet | | <1 µm | — | — |
| CF | Carbon fibre | | — | 13 µm | 700 µm |
| SGL EG | Expanded graphite | SGL Carbon | 200 µm | — | — |

The invention claimed is:

1. A composite comprising a polymer matrix, graphene and at least one thermally conductive inorganic filler, wherein the graphene and the at least one thermally conductive inorganic filler are dispersed within the polymer matrix, wherein the wt % of graphene in the matrix is in the range from 30 wt % to 70 wt %; wherein the wt % of the graphene in the polymer matrix is greater than the wt % of the at least one thermally conductive inorganic filler in the matrix, wherein the at least one thermally conductive inorganic filler comprises a group 13 nitride.

2. A composite according to claim 1, wherein the average particle size of the graphene is between 10 µm to 70 µm.

3. A composite according to claim 1, wherein the wt % of the at least one thermally conductive inorganic filler in the matrix is in the range from 10 wt % to 30 wt %.

4. A composite according to claim 1, wherein the group 13 nitride comprises aluminium nitride (AlN).

5. A composite according to claim 4, wherein the average particle size of the AlN is from 0.1 µm to 5 µm.

6. A composite according to claim 1, wherein the polymer matrix comprises a polyamide.

7. A composite according to claim 6, wherein the polymer matrix comprises a polyphthalamide (PPA).

8. The composite according to claim 1, wherein the polymer matrix comprises an aromatic polymer.

9. The composite according to claim 1, wherein the polymer matrix comprises either polyphenylene sulfide (PPS) or an amorphous blend of a polyphenyl ether (PPE) and polystyrene.

10. A solar thermal collector comprising the composite to claim 1.

11. A solar thermal collector according to claim 10 comprising a hollow body having a lower wall, an upper wall and lateral side walls and an internal cavity within said hollow body for receiving a heat exchange medium, wherein at least a portion of the upper wall is formed from the composite.

* * * * *